Nov. 22, 1932.  H. SPANGENBERG  1,888,869
AUTOMATIC CHECK HOOK
Filed June 23, 1930
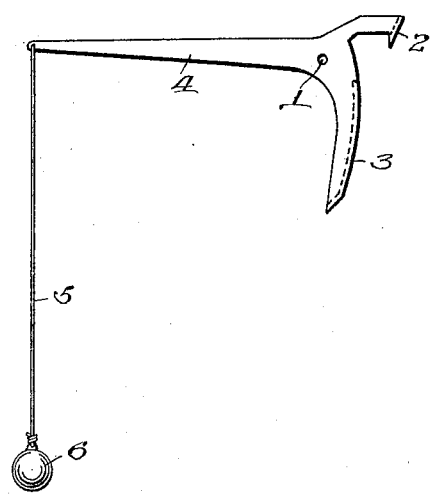
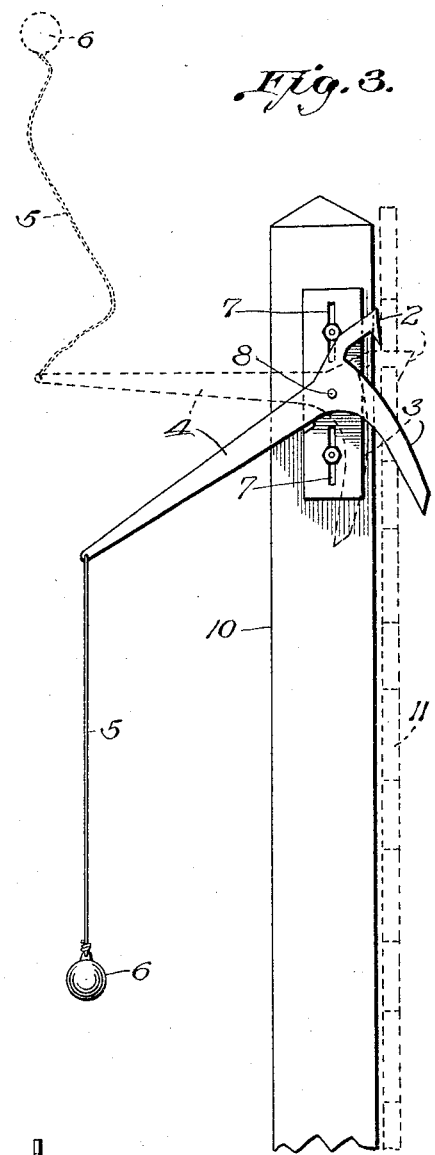
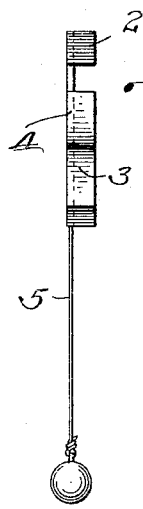
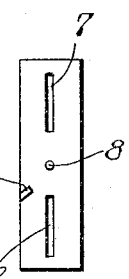
Inventor:
Henry Spangenberg Patented Nov. 22, 1932

1,888,869

UNITED STATES PATENT OFFICE

HENRY SPANGENBERG, OF LONGBRANCH, WASHINGTON

AUTOMATIC CHECK-HOOK

Application filed June 23, 1930. Serial No. 463,047.

The object of this invention is to provide an automatic check-hook for the motor-vehicle-pushed-open, double-swinging, self-closing driveway gates, that will hold open said gates a sufficient length of time for motor vehicles of all descriptions to pass through without danger of being caught by the closing gate.

To realize the importance of this invention it must be understood that to keep those gates from swinging open too far, a check post is necessarily provided, preferably placed ⅔ the length of the gate from the hinge post on each side of the gate, parallel with the road in line with the hinge post; for example: if the gate is 12 feet long the check-posts are placed 8 feet from the hinge post as above stated; that, as happens in the ordinary manner of a vehicle passing through these gates, they will swing against the checkpost with considerable momentum which causes a rebound and the gates come shut so fast that often damage is done to the vehicle or gate.

A unit of this invention placed on each checkpost will check and hold the gate when pushed open by a passing vehicle, a sufficient length of time for a slow moving vehicle to pass through without danger of being caught by the self-closing gate; it does it without attention of the driver.

Fig. 1 shows side view of automatic check-hook with weight 6 suspended therefrom by small chain or cord 5.

Fig. 2 shows an end view of the automatic check hook.

Fig. 3 shows check-post 10, end-view of open gate 11 and the automatic check hook in two operating positions. The plate, shown in Fig. 4, has pivot lug 8 in center to receive pivot hole 1, two slotted holes 7—7 to provide means for adjustment and a shoulder 9 to rest the automatic check hook in the slanting receiving position, held there by weight 6 suspended, as shown by lower view in Fig. 3.

Fig. 4 is an elevation of the plate on which the check hook is mounted.

Fig. 5 is a side view of the plate on which the check hook is mounted.

Fig. 1 comprises three prominent features in one piece, designated by 2—3—4, working in unison, as, a hook, a cam, and a lever from the end of which a weight 6 is suspended.

The pivot hole 1, Fig. 1 is placed below the horizontal plane of hook 2, as may be seen in Fig. 1, to give hook 2 a longer radius when in action and also a downward pull or pressure when stressed forward by a rebounding gate. The cam 3 is placed back, or away from the vertical plane of hook 2 as may be seen in Fig. 1, to give clearance for hook 2 to pass over gate-board 11 when gate swings open and presses back cam 3 which brings down hook 2 and also jerks up lever 4 which throws up suspended weight 6 the full length of the cord 5. By design the check-hook when pivoted without weight suspended will balance forward slightly. This forward balance, reinforced by the downward pressure of hook 2 when stressed by a rebounding gate will hold the gate positively until weight 6 drops down which holds the automatic check hook in the slanting receiving position, resting in that position on shoulder 9 as shown by the lower view of Fig. 3.

The automatic check hook and plate will now be pivotally connected 1—8 and this assembly is fastened to check-post 10 with screw-bolts through slotted holes 7—7, on a level with a board which is part of the gate 11; one being selected as near the center of the vertical plane of the gate as the different makes of gates may permit; if a steel gate, a board or plate will be placed in the proper position to act as bumper-board for cam 3, the operation of which will now be further explained.

The check-hook, shown in Fig. 1, on its pivot mounting shown in Fig. 3, attached to check-post 10 will naturally be held in the slanting position by suspending weight 6, as shown in Fig. 3. The check-hook shown in Fig. 1, being in this slanting receiving position and being one inseparable piece its prominent features necessarily working in unison, it is now obvious how, in a simple manner, the open swinging gate presses back cam 3, hook 2 comes down over gate board 11, lever 4 jerks up, the suspending weight 6 receives momentum to carry it up the full length of the cord and the check hook Fig. 1 is now in a horizontal position as shown by the upper view in Fig. 3; the hook 2 holding the gate 11 until the weight 6 drops down which reverses the operation and the check hook is again in the proper position to receive the gate for the next vehicle; this operation requires time enough for slow-moving vehicles to pass through without danger of being caught by the gate and not too long so that livestock which may be near, will not be attracted by the tardy closing gate.

I have primarily perfected this invention to supply a necessary adjunct to double-swinging, self-closing gates that will bring said gates up to a high state of efficiency; it may, however, be used for other purposes where a positive check of a limited duration is required and I have shown the preferred embodiments; but it is to be understood that various changes in the size, shape and arrangement of parts may be resorted to without departing from the spirit of the invention.

Having explained my invention I claim:

The combination with a double-swinging gate of an automatic checkhook of one piece construction having a downward, tapered, curved extension providing actuating means when struck and pushed back by an open-swinging gate, an upper neck-like forward extension with jaw on outer end pointing downward providing means to grab an open-swung gate and to hold same until released by a dropping weight, a tapered rear lever-like extension providing means to jerk up weight and a pivot hole placed in the proper position relative to the radius and leverage of the different extensions mentioned, all substantially as set forth.

HENRY SPANGENBERG.